No. 870,831.  
PATENTED NOV. 12, 1907.  
R. M. A. LEPS.  
ELASTIC WHEEL.  
APPLICATION FILED MAY 21, 1906.

8 SHEETS—SHEET 1.

WITNESSES:  
INVENTOR  
Raymond Maurice  
Amédée Leps  
BY  
ATTORNEYS.

No. 870,831. PATENTED NOV. 12, 1907.
R. M. A. LEPS.
ELASTIC WHEEL.
APPLICATION FILED MAY 21, 1906.

8 SHEETS—SHEET 3.

WITNESSES:
H. Schneider.
H.J. Suhrbier.

INVENTOR
Raymond Maurice
Amédée Leps
BY
James Loppe.
ATTORNEYS.

No. 870,831.
PATENTED NOV. 12, 1907.
R. M. A. LEPS.
ELASTIC WHEEL.
APPLICATION FILED MAY 21, 1906.
8 SHEETS—SHEET 4.
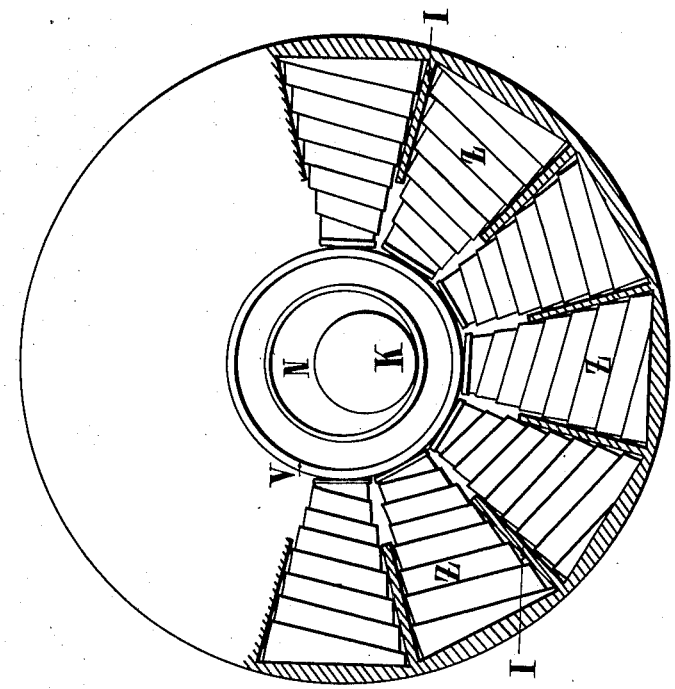
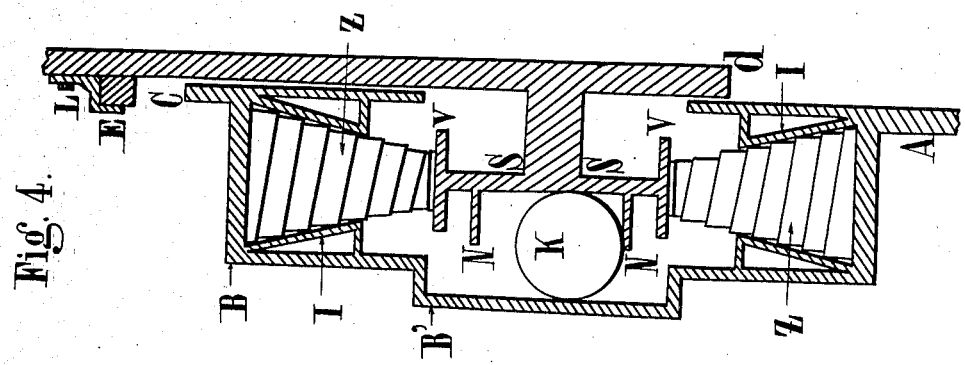

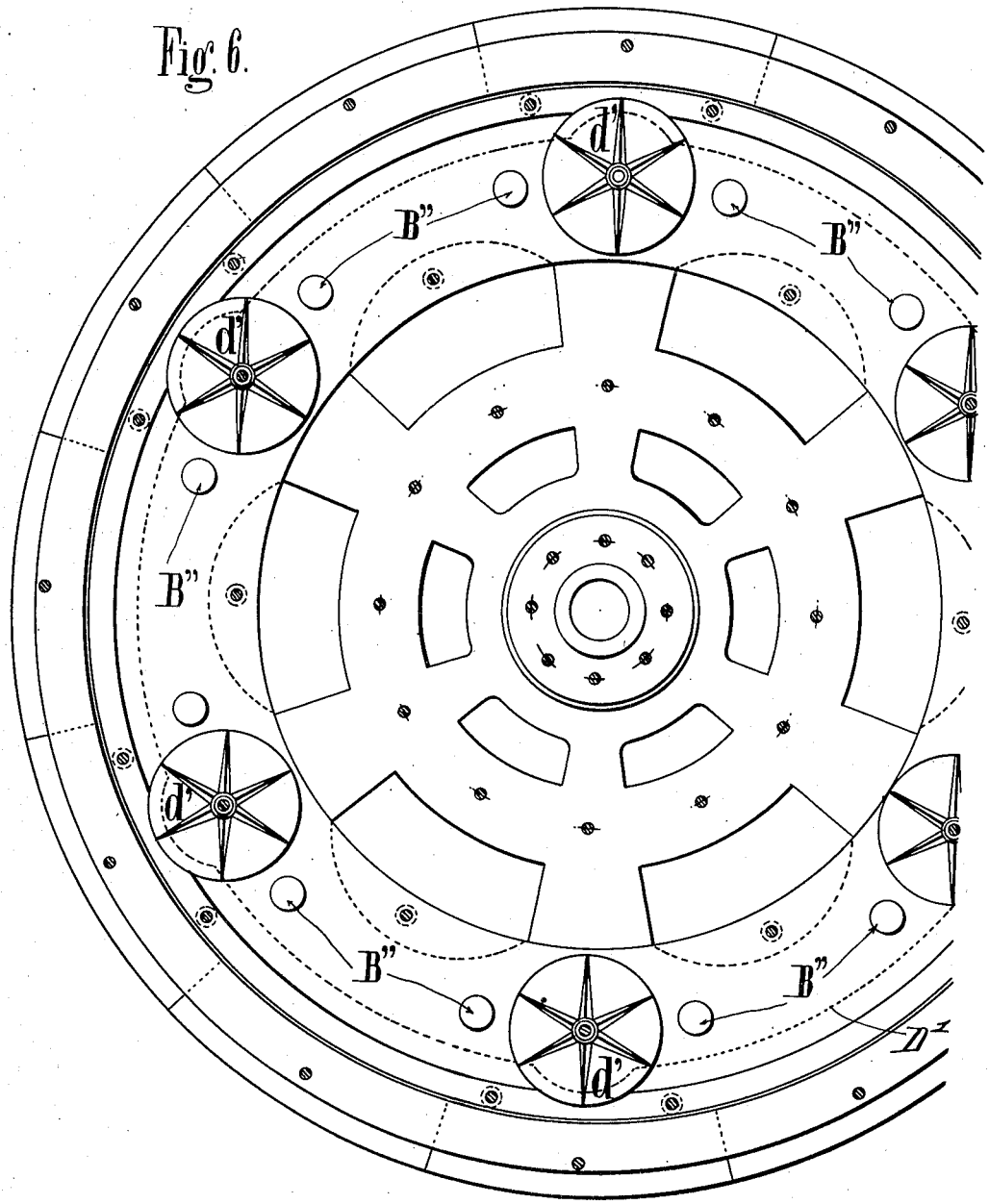

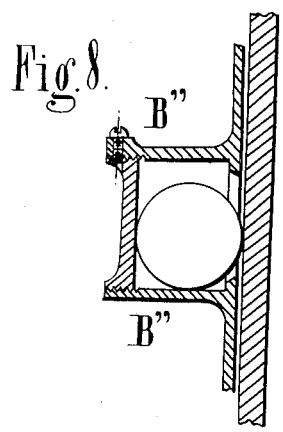
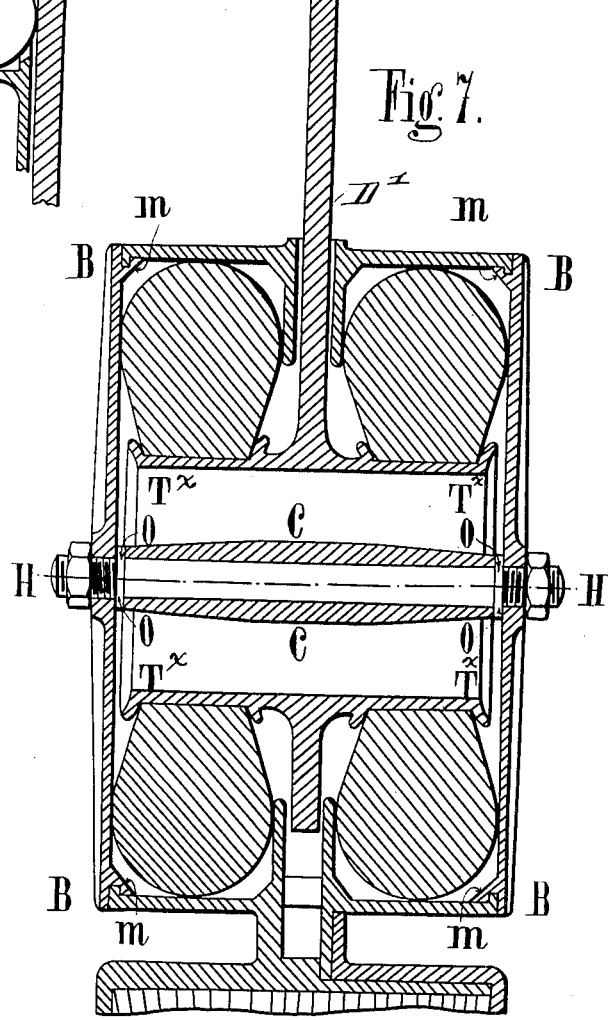

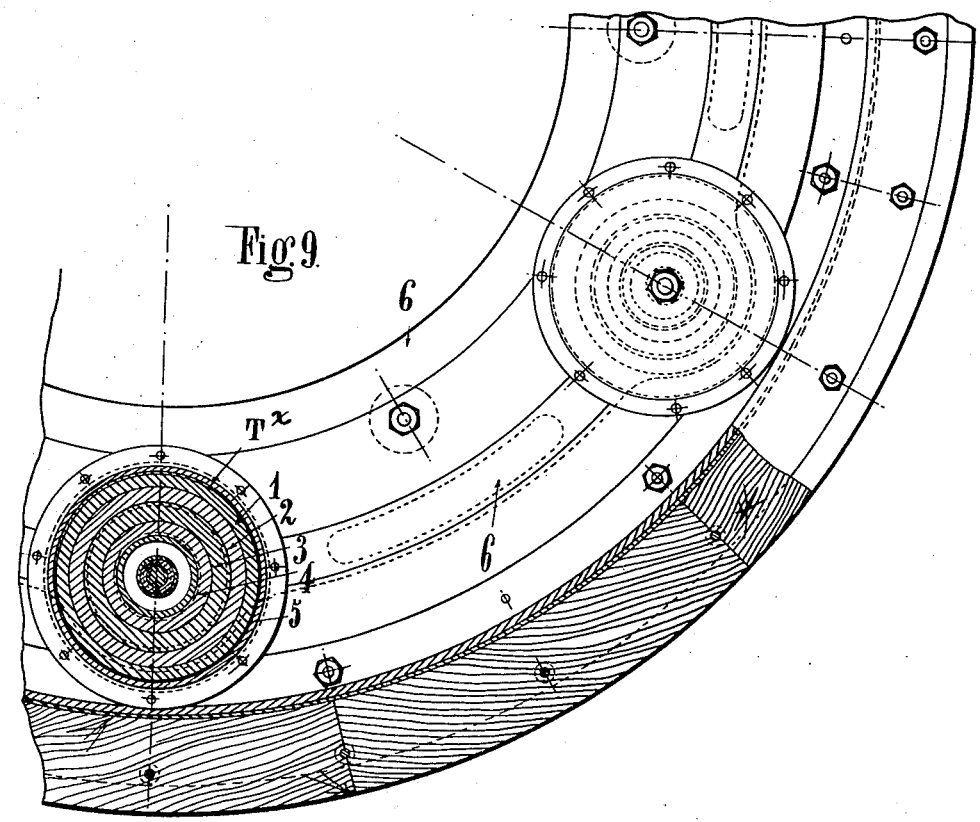

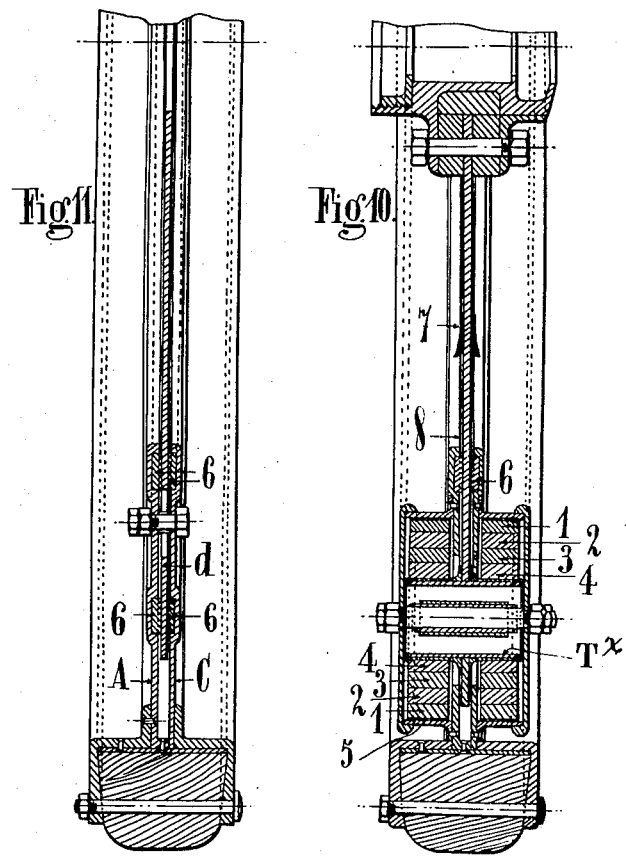

UNITED STATES PATENT OFFICE.

RAYMOND MAURICE AMÉDÉE LEPS, OF BORDEAUX, FRANCE.

ELASTIC WHEEL.

No. 870,831.

Specification of Letters Patent.

Patented Nov. 12, 1907.

Application filed May 21, 1906. Serial No. 318,008.

*To all whom it may concern:*

Be it known that I, RAYMOND MAURICE AMÉDÉE LEPS, a citizen of the Republic of France, and resident of Bordeaux, France, have invented a new and useful Improved Elastic Wheel, which wheel is fully set forth in the following specification.

This invention relates to an elastic wheel for vehicles constructions of which are shown, by way of example, in the accompanying drawing.

Figure 1:
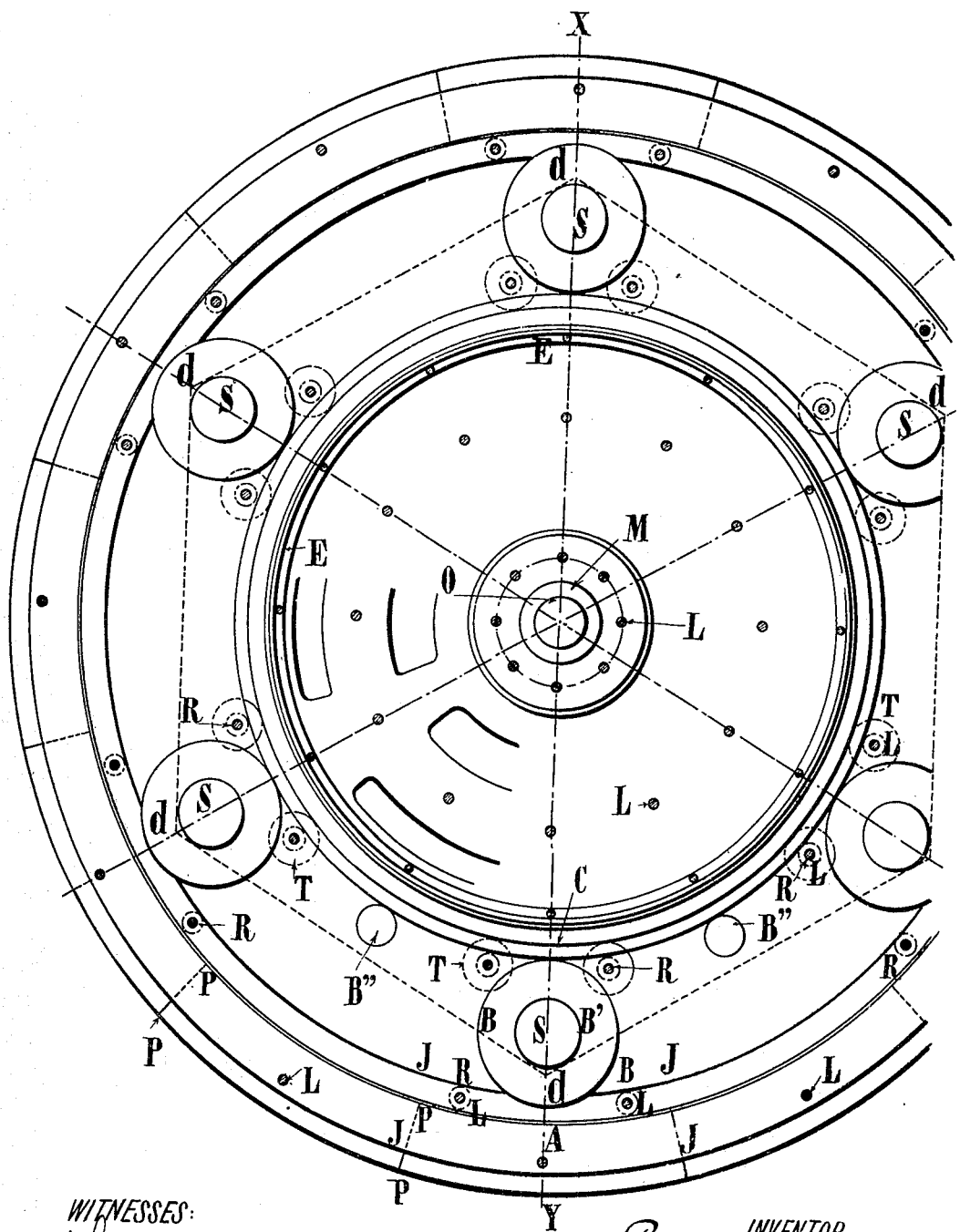
Figure 2:
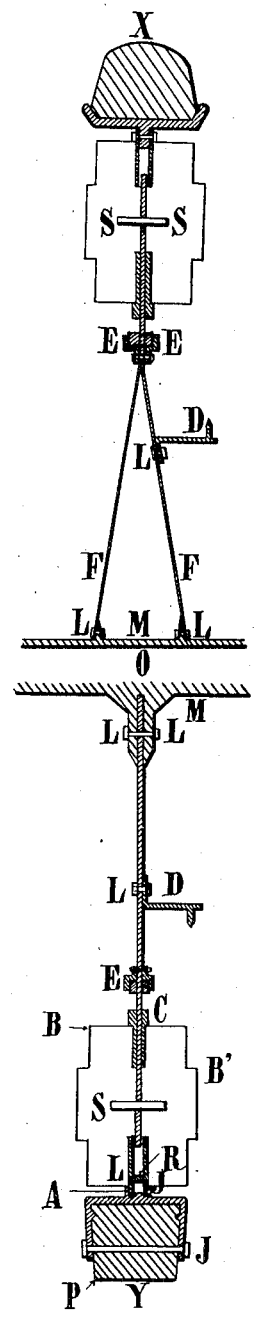
Figure 3:
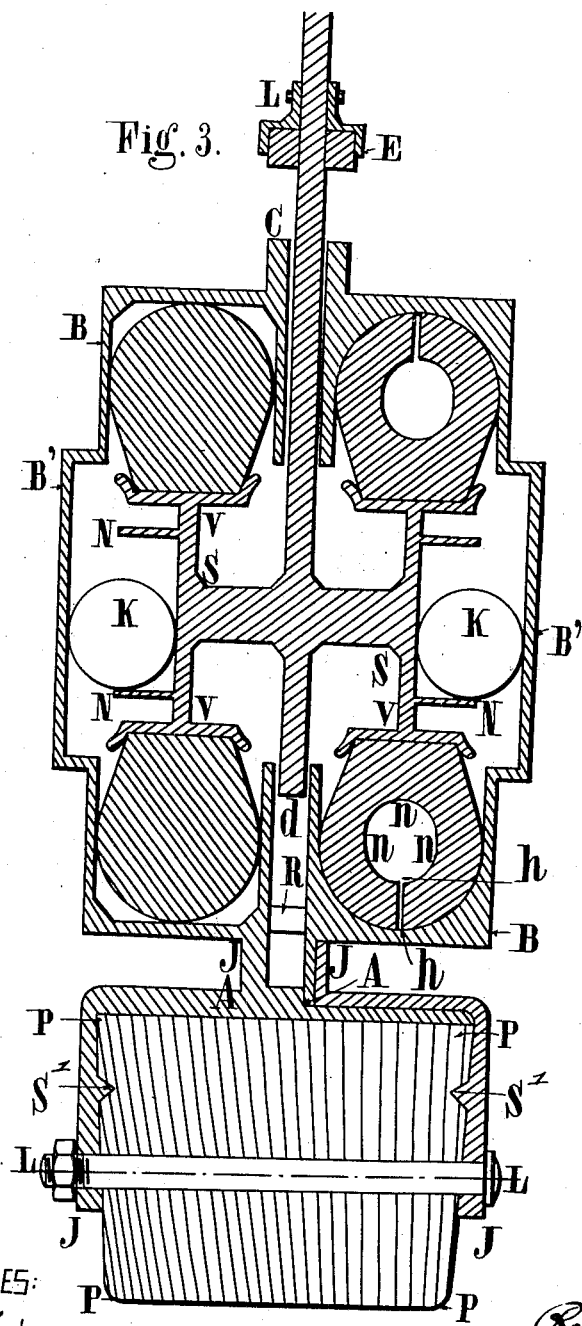

Figure 1 is a side view showing the whole of a wheel according to this invention. Fig. 2 is a cross section. Fig. 3 is a cross-section on a larger scale of one of the supporting and suspension boxes. Fig. 4 is a cross-section of one half of a suspension box fitted with conical metal springs. Fig. 5 is a side elevation thereof. Figs. 6, 7 and 8 show a modified construction of wheel according to this invention. Fig. 6 is a side elevation showing the whole of the wheel. Fig. 7 is a cross-section on a larger scale of a suspension and supporting box fitted with solid rubber rings. Fig. 8 is a section of the ball box. Figs. 9, 10 and 11 show a modified wheel according to this invention. Fig 9 is a view of part of the wheel, partly in section and partly in elevation. Figs. 10 and 11 are cross-sections.

The elastic wheel chiefly comprises

1. A central hexagonal steel disk $d$, Fig. 1, provided with six double brackets S, Figs. 1 and 3.

2. Two sheet steel rings A C forming cheeks and carrying suspension and supporting boxes B B provided with balls.

3. Two other rings J J forming half-rims, one of these half-rims (on the inner side of the wheel), is permanently secured and forms one piece with the inner annular cheek.

4. A tread band constituted by a series of wooden blocks P (or they may be hardened cardboard or any other suitable material) which are held in place by inner projecting clamps $S^1$, Fig. 3, on the half or divided rims, and by bolts L.

The parts constituting the wheel will now be described in detail.

*Description of the disk.* The disk can be solid or perforated, its thickness varying according to the strength which is to be given to the wheel. It could be constituted by two plates F F, Fig. 2, (section on line O—X, Fig. 1), made of stamped sheet steel connected by means of the hub M at the inner ends and soldered together at their outer ends towards the circumference, so as to form a flat ring at the portion intended to slide between the annular cheeks. In the event of a solid disk being used, holes made in its body will enable it to be securely fixed by bolts L to the hub M, and the toothed ring D and brake drums to the disk itself, Fig. 2, (sections on lines O—X and O—Y). When a hollow disk is used, the hub is riveted to the two sides F F. The toothed rings and the brake drums are riveted to the inner side. At its circumference, the disk is provided with six double symmetrical brackets for the six boxes B of the annular cheeks A C. These brackets will be described hereinafter together with the boxes. The periphery of the disk is hexagonal, for the purpose of economizing weight by doing away with useless material while keeping it as rigid as possible. The disk is held by the box device between the annular cheeks and can slide vertically between them. 24 bolts connect the inner side or cheek to the outer side or cheek. Twelve circular holes T (Fig. 1 dotted lines) are made in the disk for the passage of the twelve upper bolts, and the dimensions of the said holes are calculated in accordance with the limits of yielding in every direction provided for the tires or the springs of the boxes (according to circumstances). Two shoulder rings E (Figs. 1 and 2, plan and section), of circular shape arranged symmetrically relatively to the plane of the disk and concentric with the disk, having the shape of channels open towards the circumference, limit, by striking against the inner edges C of the lateral rings, the play of the disk in vertical direction between the said rings, in case of severe shocks. The interior of these grooves is filled with a ring of a slightly smaller circumference, made of solid rubber, to take up the shocks. The number of the brackets like that of the boxes, which, in this construction is assumed to be six, can vary in accordance with the weight to be supported and the dimensions of the brackets and of the boxes, will be determined exactly by experiments.

*Description of the annular cheeks and boxes.* The two annular cheeks A C which, with their boxes B and $B^1$ constitute the elastic suspension and supporting apparatus proper, afford connection between the disk and the tread surface. These two rings or cheeks are connected and held parallel to each other, by twenty-four bolts; twelve at the inner circumference and twelve at the outer circumference; the latter at the same time secure the outer half-rims to the said rings or cheeks. The distance and the parallel position of the cheeks is insured by twenty-four stays or distance pieces R, Fig. 1 dotted, and Fig. 3, of a thickness slightly greater than that of the disk, so as to enable it to play freely without friction between them. These stays are in one piece with the inner annular cheek, the outer cheek being applied against them by the bolts L which pass through their center. Besides keeping the rings parallel, the stays also insure the driving of the said cheeks, and consequently of the whole wheel, in the direction of rotation by the edges of the holes T of the disk striking them, in the event of excessive compression of the tires or of the springs in the boxes.

In Fig. 1 which is a general plan of the wheel, the dotted lines show at $d$ the polygonal outline of the disk, at T the circular holes made in the disk and at R the stays maintaining the annular cheeks at the distance required for the free play of the disk. All these details are invisible, being covered by the annular cheeks. The cut-away portions of the disk show an example of how the said part may be lightened. As regards the boxes, an examination of Fig. 3, showing a section on line O—Y will make it clearer than any description, how the disk $d$ is supported by means of its brackets S. These brackets are, in fact, constituted by two arms at right angles to the disk and welded or secured to two bands V V parallel to the faces of the disk. The cross flanges of these annular bands form a channel in which is inserted a rubber ring or packing (Fig. 3). This ring itself rests on the circular bottom of the box B. The suspension or support in vertical direction is thus insured, and the connection of the disk with the annular cheeks, is insured by the walls of the boxes B in the direction of rotation and of driving. In the lateral direction (skidding of the driving wheels, rotation for turning the steering wheels), the connection of the disk with the annular cheeks is insured by the balls K which, rotating between the walls of the boxes B' and those of the bands V of the bracket, maintain a constant distance and prevent, in these oscillations, any friction of the disk against the walls of the annular cheeks, while transmitting the lateral strains, and enabling the elasticity of rubber tires or springs to come into full play. If it be considered that the twelve balls in the boxes B' are not sufficient for these various purposes, there is nothing to prevent another twelve boxes being arranged like B'' Fig. 1, on the annular cheeks. The balls contained in these boxes, will act then directly on the faces of the disk and insure absolutely constant parallel direction between the disk and the cheeks over the whole of their surface, whatever might be the lateral strains.

Fig. 3 shows two forms of rings; the left hand one is of solid rubber, the right hand one of hollow rubber forming a number of cells $n$ which are perforated in such manner that the passage $h$ being closed at the moment when pressure takes place, the cells, filled with compressed air, constitute, for the moment, so many pneumatic tires. Pneumatic tubes of similar shape could also be employed instead of hollow rubber rings.

Figs. 4 and 5 show in section and plan an entirely metallic construction. The rubber rings are replaced by twelve steel spiral springs Z of conical shape placed in cells arranged radially round the flanges of the band V. These springs are strongly held at their base, along two-thirds of their length, in cells which are also of conical shape. They penetrate into them with a small amount of friction and are free along the last third of their length. The cells B' of the various boxes are mounted so as to enable an adjustment to be effected by screwing, the said adjustment insuring contact without jamming with the balls and avoiding any looseness of the disk between the annular cheeks. On the contrary, the face B which must be capable of being easily opened for examination and exchange of elastic parts, is made in a fixed and constant manner.

As shown in Figs. 3 and 4 at E, the double shoulder ring E having the shape of a channel and provided with rubber by striking against the edges C of the annular cheeks, limits the play of the disk when violent shocks are experienced.

It follows from the preceding description, 1. That in the wheel described, the central disk carrying the axle of the vehicle rests on twelve points which all work simultaneously and to the same extent in any position, so that the distribution of the total pressure is effected over a large number of elastic points instead of on a single point of contact with the ground, as in ordinary wheels. 2. That the elasticity is obtained in the direction of suspension as well as in that of the driving or rotation of the system. 3. That all the elastic parts are simple and strong and very little liable to injury, and are protected; while they are easily accessible for repair or exchange.

*Description of the rim and of the tread surface.* An ordinary rim with solid rubber, such as a Kelly band or any other, Fig. 2 section O—X, can obviously be easily mounted on the wheel described. Such tire would certainly act better on this wheel which is resilient in itself, than on an ordinary wheel with rigid spokes. The tire will suffer less from the roughness of the road; it will be cut less easily and will last longer. It has, however, the drawback of being expensive, therefore, considering that the resiliency of the wheel itself is sufficient, owing to the large number of points of suspension, it is possible to utilize a non-elastic tread surface, which will be cheap, sufficiently strong and easily repaired or replaced. For this purpose a rim with removable blocks of wood, cardboard or other material has been devised as shown in the drawing.

Figs. 1 and 2 (section O—Y) and Fig. 3 show in a sufficiently clear manner to require little description, the way in which the blocks are held in place, and how the outer half-rim J can be easily removed, by removing on the one hand, the twelve bolts which connect it to the annular cheeks, and, on the other hand, the twelve bolts which pass through the rim and tire and insure the blocks being fixed between the projecting clamps or points of the half-rims, and finally how the said half-rims form jaws owing to their greater thickness at the circumference, and the trapezoidal shape of the section of the blocks. It is also unnecessary to describe the facility with which worn out or damaged blocks can be replaced or repaired. The blocks must be cut in such manner that the tread surface should be normal to the grain of the wood. They should be impregnated and rendered water-proof. Other light material sufficiently resistant to wear, tearing or damp, could be used instead of wood. If desired, the connection of the blocks between each other, can be completed at their joints by means of staples or screws counter-sunk in the thickness of the rim. Finally, nails or screws with slightly projecting heads, screwed into the body of the blocks, could be used to decrease to a considerable extent the wear of the blocks, and at the same time would afford an anti-skidding device of great efficiency.

Figs. 6, 7 and 8 show another construction with the following modifications.

1. The central disk which can still be constituted by a solid or perforated plate, or made of two stamped pieces of sheet metal, is circular as shown dotted at D in Fig. 6 and not hexagonal.

2. The two circular shoulder rings forming channels provided with rubber, are done away with.

3. The suspension and driving boxes are designed as shown in Fig. 7. In these boxes, the balls have been done away with, and the faces B are made flat and provided outside with six radial ribs starting from a central boss. A bolt H passes through the said boss and connects together the inside and the outside faces of each box and consequently the two annular cheeks. These faces forming, so to say, a cover, engage with the body of the box and are supported on it by circular projections $m$ (when rubber rings are used as elastic material, Fig. 7) or engage with the said body or surround it outside like the cover of an ordinary box (when conical springs are used). The closing is insured by an ordinary screw-thread or by divided thread (as in breech blocks for guns) or by means of a bayonet joint engaging with projections made in the flanges of the box, Fig. 7. Moreover, the bolt H connecting the faces B of the box, is provided with two shoulders $o$ for limiting and insuring the action of the tightening nuts. This bolt is passed through a rubber tube $c$ widened in its center. For each box it replaces, as regards their function during violent shocks, the two shoulder rings E which have been done away with, and insures rotation of the annular cheeks in the event of excessive compression of the rubber tires or springs, the rubber tube serving to deaden the shock. Finally, the brackets S Fig. 3, are replaced by tubular supports $T^X$ with grooves for receiving rubber tires or rings. These tubes are normal to the plane of the central disk to which they are secured as shown in Fig. 7; and the bolt described finds its place in their center, during the oscillations of the disk in any direction.

4. The annular cheeks are of less width and no longer strengthened at the inner circumference which was facing the rubber of the shoulder-rings E, and in the interior of the boxes they are cut away to a greater width so as to give the tubular supports free play.

The ball boxes B″ (Fig. 6) of which there are twelve on each side, are here independent of the suspension boxes. They are arranged to the right and to the left of the said suspension boxes, and their outer face is adjustable as shown in Fig. 8. The ball rests directly between the central disk and the adjustable face. The said face having been properly adjusted, it is fixed in that position by a small set screw mounted in a metallic projection of the box, the end of the screw being smooth and engaging with one of twelve recesses made in the flange of the adjustable face.

Figs. 9, 10 and 11 show a further construction in which the rubber rings of the boxes B B (Figs. 3 and 7) are replaced by concentric rubber rings 1 2 3 4 completely filling the boxes. The number of concentric rings can be any desired, but the essential point is that it should be easily possible to replace the inner rings or those nearest the tubular supports which are the only ones liable to wear. It would thus be possible to have a single ring of great thickness replacing the rings 1, 2 and 3, and an inner ring 4 of smaller thickness arranged round the tubular support $T^X$. In order to avoid contact of rubber rings with the metallic portions of the box B B′, there can be arranged at 5 leather rings provided at intervals with longitudinal slots, that is to say, parallel to the bolt. In this construction balls are completely done away with, and replaced by a first ring and concentric segments of greasy leather 6 mounted in the cheeks A C, against which the central disk $d$ can rub (Figs. 10 and 11.) The tire proper can be made, as before, of any suitable material such as wood, solid or hollow rubber, cardboard, etc. At 7 is arranged, on each side of the disk $d$, a shoulder tapering towards the periphery of the wheel for preventing dust from getting at 8 between the central disk $d$ and the annular cheeks A and C. Instead of securing the hub supports $T^X$ in the central disk, it will be readily understood that the central disk could be secured to the annular cheeks and consequently to the boxes which then would surround a circular ring secured both to the supporting hub and to the tire and adapted to slide between the walls of the cheeks.

Having thus described my invention, I claim as new and desire to secure by Letters Patent:

1. In a vehicle-wheel, the combination, with the hub and the central supporting-disk having laterally-disposed flanges at its periphery, of annular cheeks arranged about the peripheral portion of said disk and between which the same slides, boxes carried by said cheeks and inclosing said flanges, and cushioning devices interposed between said flanges and the boxes.

2. In a vehicle-wheel, the combination, with the hub, of a central supporting-disk having flanges extending laterally therefrom in opposite directions at its periphery, annular cheeks between which said disk is arranged to slide at its peripheral portion, boxes carried by said cheeks, and cushioning devices interposed between said lateral flanges of the disk and the opposite walls of said boxes.

3. In a vehicle-wheel, the combination, with the hub, of a supporting-disk carried by said hub and provided at points near its edge with annular flanges extending laterally therefrom at both faces of the disk, annular cheeks between which said disk is arranged to slide at its periphery, boxes carried by said checks and inclosing said flanges, and resilient devices interposed between said flanges and the opposite walls of said boxes.

4. In a vehicle-wheel, the combination, with the hub, of a supporting-disk, annular cheeks between which said disk slides at its periphery, cushioning devices interposed between said cheeks and said disk, balls interposed between the opposing surfaces of said cheeks and said disk, and a tread-surface carried by said cheeks.

5. In a vehicle-wheel, the combination, with the hub, of a supporting-disk or web having at its periphery laterally-extending supports, annular cheeks disposed about the peripheral portion of said disk and between which the same is arranged to slide, boxes carried by said cheeks, cushioning devices interposed between said supports and said boxes in such a manner as to cushion the edgewise movement of the disk, and balls interposed between said supports and said boxes whereby the relative lateral play of said boxes and said cheeks is prevented.

6. In a vehicle-wheel, the combination of a supporting-disk having at its periphery a series of supports extending laterally, in opposite directions from the faces of said disk, annular lateral flanges carried by said supports, annular cheeks between which the disk is slidable at its peripheral portion, boxes carried by said cheeks and inclosing said supports and flanges, cushioning devices interposed between said flanges and the opposite walls of said boxes, and antifriction devices interposed between said supports and the upright side-walls of said boxes.

7. In a vehicle-wheel, the combination of a supporting-disk, annular cushioning-shoulders carried by said disk near the periphery of the same, annular cheeks between which said disk is arranged to slide at its peripheral portion, and cushioning devices interposed between said cheeks and said disk, said cushioning devices permitting the inner edges of said cheeks to abut against said cushioning-shoulders of the disk in the event of a hard jolt or shock.

In testimony whereof I have signed this specification in the presence of two subscribing witnesses.

RAYMOND MAURICE AMÉDÉE LEPS.

Witnesses:
 A. PHILLIPS,
 BORBE PIERRE.